United States Patent
Suzumura et al.

(10) Patent No.: US 10,738,883 B2
(45) Date of Patent: Aug. 11, 2020

(54) CONTROLLER OF POWER TRANSMISSION SYSTEM FOR VEHICLE

(71) Applicants: TOYOTA JIDOSHA KABUSHIKI KAISHA, Toyota-shi, Aichi-ken (JP); DENSO TEN Limited, Kobe-shi, Hyogo (JP)

(72) Inventors: Kyohei Suzumura, Nagoya (JP); Shinya Toyoda, Nisshin (JP); Masayuki Tsujita, Okazaki (JP); Tetsuya Okumura, Kobe (JP)

(73) Assignees: TOYOTA JIDOSHA KABUSHIKI KAISHA, Toyota (JP); DENSO TEN LIMITED, Kobe (JP)

( * ) Notice: Subject to any disclaimer, the term of this patent is extended or adjusted under 35 U.S.C. 154(b) by 0 days.

(21) Appl. No.: 16/352,102

(22) Filed: Mar. 13, 2019

(65) Prior Publication Data
US 2019/0293173 A1 Sep. 26, 2019

(30) Foreign Application Priority Data
Mar. 23, 2018 (JP) .................................. 2018-057099

(51) Int. Cl.
*F16H 61/12* (2010.01)
*F16H 9/18* (2006.01)
(Continued)

(52) U.S. Cl.
CPC ............... *F16H 61/12* (2013.01); *F16H 9/18* (2013.01); *F16H 37/0846* (2013.01);
(Continued)

(58) Field of Classification Search
CPC ........... Y10T 477/6203; Y10T 477/624; Y10T 477/6242; B60W 10/107; B60W 10/02;
(Continued)

(56) References Cited

U.S. PATENT DOCUMENTS

| 2016/0305522 | A1 | 10/2016 | Fukao et al. |
| 2019/0049001 | A1* | 2/2019 | Harada ................. G01L 27/007 |
| 2019/0195359 | A1* | 6/2019 | Hattori .............. F16H 61/66272 |

FOREIGN PATENT DOCUMENTS

| JP | 5765168 B2 | 8/2015 |
| JP | 2016-205473 A | 12/2016 |

\* cited by examiner

*Primary Examiner* — Roger L Pang
(74) *Attorney, Agent, or Firm* — Oliff PLC

(57) ABSTRACT

A controller of a power transmission system for a vehicle includes an electronic control unit. When a difference between a secondary pressure set by use of a command pressure of the electromagnetic control valve for the secondary pulley, and an actual pressure obtained by a hydraulic pressure sensor, is larger than a predetermined pressure difference, the electronic control sets a primary pressure and the secondary pressure such that a speed ratio of a continuously variable transmission becomes substantially equal to a maximum value. The electronic control unit determines that there is an abnormality that an output pressure of the electromagnetic control valve for a secondary pulley is low, when the speed ratio is smaller than a predetermined first determination value, and determines that there is an abnormality in the hydraulic pressure sensor, when the speed ratio is larger than a predetermined second determination value.

4 Claims, 9 Drawing Sheets

(51) Int. Cl.
  *F16H 37/08*  (2006.01)
  *F16H 59/68*  (2006.01)
  *F16H 59/70*  (2006.01)
  *B60W 20/50*  (2016.01)
  *B60W 10/107*  (2012.01)
  *B60W 10/02*  (2006.01)

(52) U.S. Cl.
  CPC ........... *B60W 10/02* (2013.01); *B60W 10/107* (2013.01); *B60W 20/50* (2013.01); *B60W 2510/1005* (2013.01); *B60W 2510/1085* (2013.01); *B60W 2710/1005* (2013.01); *B60W 2710/1088* (2013.01); *F16H 59/70* (2013.01); *F16H 2037/0873* (2013.01); *F16H 2059/683* (2013.01); *F16H 2059/704* (2013.01); *F16H 2061/1232* (2013.01); *F16H 2061/1284* (2013.01); *Y10T 477/6203* (2015.01); *Y10T 477/624* (2015.01); *Y10T 477/6242* (2015.01)

(58) Field of Classification Search
  CPC ......... B60W 20/50; B60W 2510/1005; B60W 2510/1085; B60W 2710/1005; B60W 2710/1088; F16H 61/12; F16H 37/0846; F16H 2059/683; F16H 59/70; F16H 2061/1284; F16H 2061/1232; F16H 2059/704; F16H 2061/1264; F16H 61/662; F16H 61/0251
  USPC ...................................................... 701/62, 63
  See application file for complete search history.

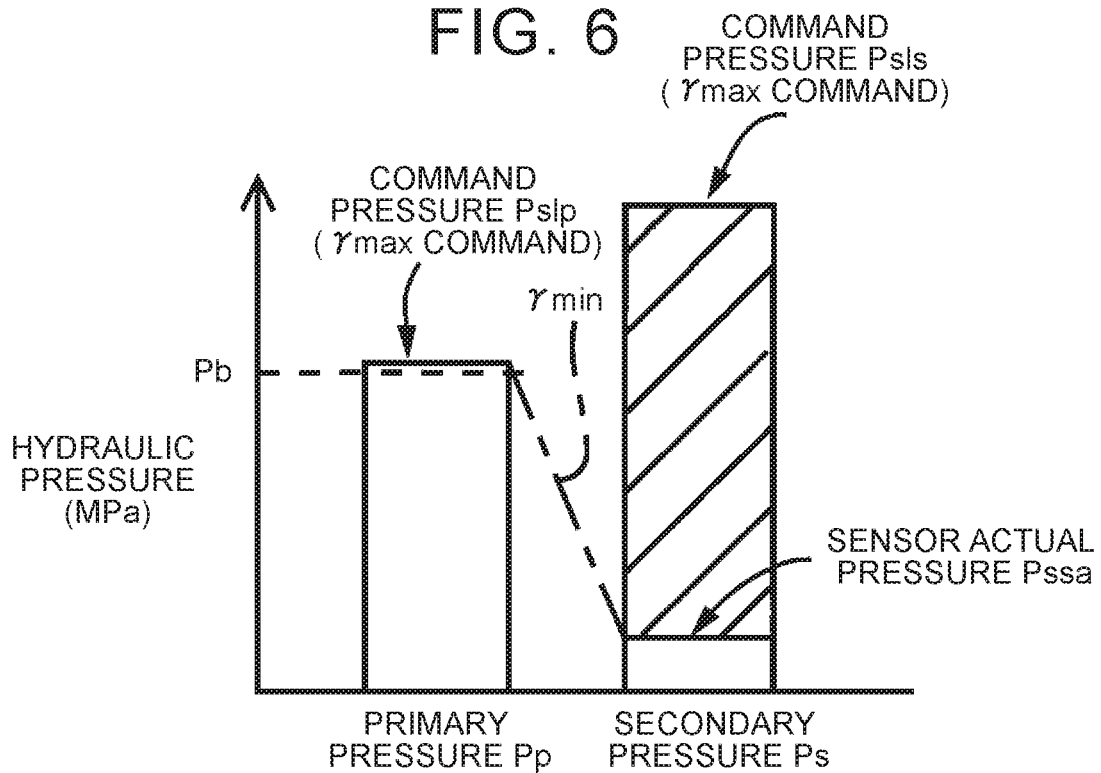
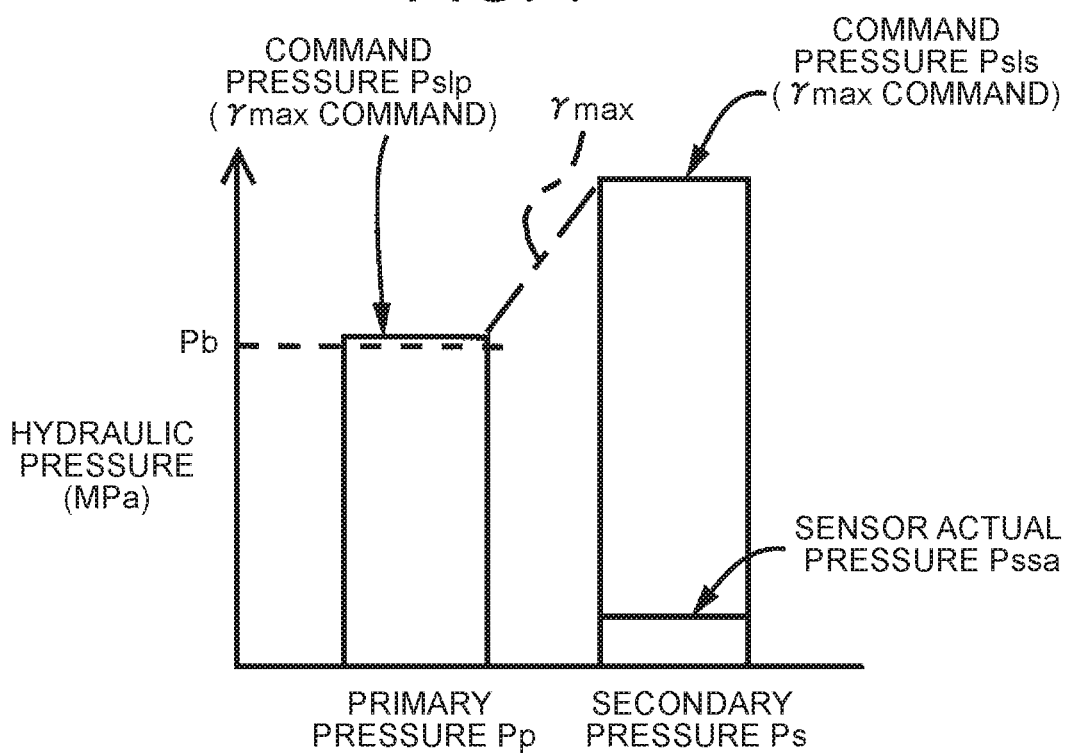

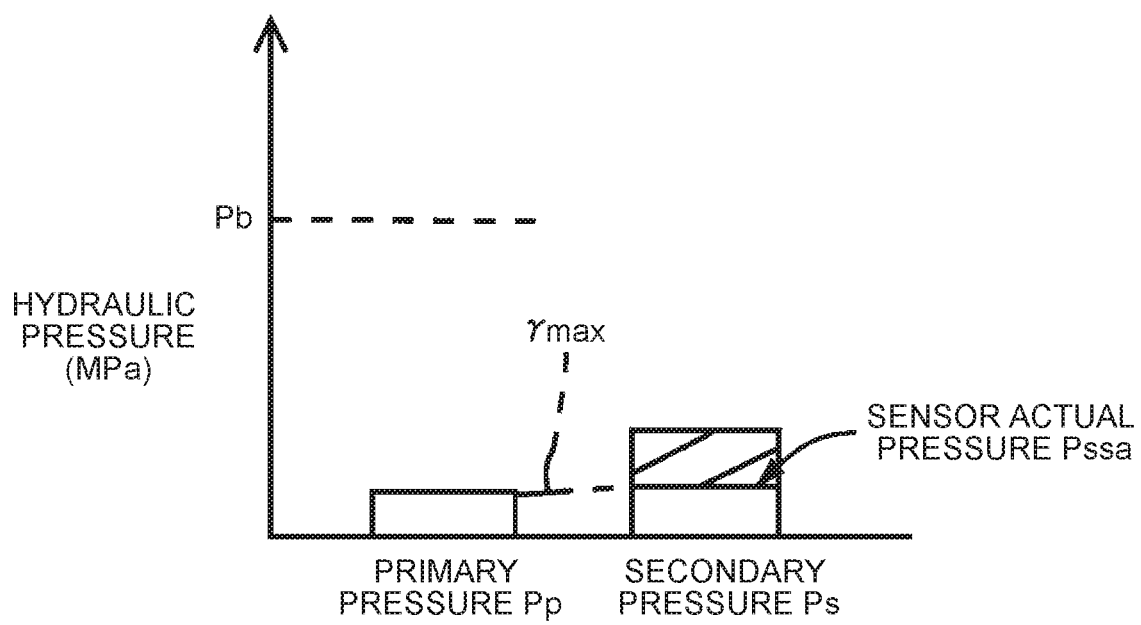

CONTROLLER OF POWER TRANSMISSION SYSTEM FOR VEHICLE

INCORPORATION BY REFERENCE

The disclosure of Japanese Patent Application No. 2018-057099 filed on Mar. 23, 2018 including the specification, drawings and abstract is incorporated herein by reference in its entirety.

BACKGROUND

1. Technical Field

The disclosure relates to a controller of a power transmission system for a vehicle including a continuously variable transmission between a drive power source and an output shaft.

2. Description of Related Art

A power transmission system for a vehicle is known which includes a continuously variable transmission provided between a drive power source and an output shaft and having a transmission element looped around a primary pulley and a secondary pulley, and an electromagnetic control valve for the secondary pulley. The continuously variable transmission is operable to transmit power of the drive power source to the output shaft. The electromagnetic control valve for the secondary pulley supplies a hydraulic pressure to the secondary pulley. One example of the vehicular power transmission system is described in Japanese Unexamined Patent Application Publication No. 2016-205473 (JP 2016-205473 A). In the power transmission system disclosed in JP 2016-205473 A, an electromagnetic control valve for the primary pulley, which supplies a hydraulic pressure to the primary pulley of the continuously variable transmission, and an electromagnetic control valve for the secondary pulley, which supplies a hydraulic pressure to the secondary pulley, are provided between the drive power source and the output shaft.

SUMMARY

In the continuously variable transmission that has the transmission element looped around the primary pulley and the secondary pulley and transmits power of the drive power source to the output shaft, it is necessary to appropriately maintain the clamping force applied to the transmission element, so as to curb or prevent slipping of the transmission element. Therefore, it is determined whether there is an abnormality that is reduction of the clamping force applied to the transmission element. It is determined whether there is an abnormality that is reduction of the clamping force, based on a difference between a command pressure as a required value of the hydraulic pressure to the electromagnetic control valve for the secondary pulley which supplies the hydraulic pressure to the secondary pulley, and the actual pressure, namely, the hydraulic pressure supplied to the secondary pulley and obtained by a hydraulic pressure sensor separately provided. In this determination, it cannot be determined whether the reduction of the clamping force as the abnormality is caused by a problem of the electromagnetic control valve for the secondary pulley, or caused by a problem of the hydraulic pressure sensor. Therefore, the clamping force reduction abnormality may not be dealt with in the optimum manner.

This disclosure provides a controller of a power transmission system for a vehicle, which can identify which of an electromagnetic control valve for a secondary pulley and a hydraulic pressure sensor has a problem that causes a clamping force reduction abnormality.

A controller of a power transmission system for a vehicle according to one aspect of the disclosure includes an electronic control unit. The power transmission system includes a continuously variable transmission, a continuously variable transmission connecting and disconnecting device, an electromagnetic control valve for a secondary pulley, and a hydraulic pressure sensor. The continuously variable transmission has a primary pulley, the secondary pulley, and a transmission element looped around the primary pulley and the secondary pulley. The continuously variable transmission is provided in a first power transmission path through which power of a drive power source is transmitted to an output shaft. The continuously variable transmission connecting and disconnecting device is provided in the first power transmission path and is configured to connect and disconnect the first power transmission path. The electromagnetic control valve for the secondary pulley is configured to control a secondary pressure supplied to the secondary pulley, by use of a command pressure. The hydraulic pressure sensor is configured to determine an actual pressure supplied to the secondary pulley. When a difference between the secondary pressure set by use of the command pressure of the electromagnetic control valve for the secondary pulley, and the actual pressure obtained by the hydraulic pressure sensor, is larger than a predetermined pressure difference, during traveling using the first power transmission path, the electronic control unit causes the continuously variable transmission connecting and disconnecting device to disconnect the first power transmission path, and sets a primary pressure supplied to the primary pulley and the secondary pressure supplied to the secondary pulley, by use of respective command pressures determined such that a speed ratio of the continuously variable transmission becomes substantially equal to a maximum value. The electronic control unit determines that there is an abnormality that an output pressure of the electromagnetic control valve for the secondary pulley is low, when the speed ratio of the continuously variable transmission is smaller than a predetermined first determination value, and determines that there is an abnormality in the hydraulic pressure sensor, when the speed ratio of the continuously variable transmission is larger than a predetermined second determination value.

With the controller configured as described above, when a difference between the secondary pressure set based on the command pressure of the electromagnetic control valve for the secondary pulley and the actual pressure obtained by the hydraulic pressure sensor is larger than a predetermined pressure difference, namely, when there is an abnormality, i.e., reduction of the clamping force, it is possible to identify which of the electromagnetic control valve for the secondary pulley and the hydraulic pressure sensor has a problem that causes the abnormality.

The power transmission system may include a second power transmission path, and a gear transmission mechanism connecting and disconnecting device. The second power transmission path may include a speed change mechanism having at least one gear ratio between the drive power source and the output shaft. The gear transmission mechanism connecting and disconnecting device may be configured to connect and disconnect the second power transmission path. The second power transmission path and the gear transmission mechanism connecting and disconnecting device may be disposed in parallel with the first power transmission path between the drive power source and the output shaft.

With the controller configured as described above, when a difference between the secondary pressure set based on the command pressure of the electromagnetic control valve for the secondary pulley and the actual pressure obtained by the hydraulic pressure sensor is larger than the predetermined pressure difference, namely, when there is an abnormality, i.e., reduction of the clamping force, it is possible to identify which of the electromagnetic control valve for the secondary pulley and the hydraulic pressure sensor has a problem that causes the abnormality.

In the controller, the electronic control unit may be configured to determine the abnormality that the output pressure of the electromagnetic control valve for the secondary pulley is low, and switch the vehicle to a traveling mode using the second power transmission path, when the speed ratio of the continuously variable transmission is smaller than the predetermined first determination value. The electronic control unit may be configured to determine the abnormality in the hydraulic pressure sensor, and resume traveling using the first power transmission path, when the speed ratio of the continuously variable transmission is larger than the predetermined second determination value.

With the controller configured as described above, when there is an abnormality, i.e., reduction of the clamping force, it is possible to identify which of the electromagnetic control valve for the secondary pulley and the hydraulic pressure sensor has a problem that causes the abnormality, and it is also possible to select appropriate limp-home traveling based on the result of identification.

In the controller, the electronic control unit may be configured to set the primary pressure supplied to the primary pulley and the secondary pressure supplied to the secondary pulley, by use of a command pressure of an electromagnetic control valve for the primary pulley and the command pressure of the electromagnetic control valve for the secondary pulley which are determined such that the speed ratio of the continuously variable transmission becomes substantially equal to the maximum value, under a condition that the command pressure of the electromagnetic control valve for the primary pulley is equal to or higher than a predetermined hydraulic pressure.

With the controller configured as described above, it is possible to avoid a situation where the primary pressure supplied to the primary pulley is reduced, whereby the speed ratio of the continuously variable transmission is determined as the maximum value γmax, and it is erroneously determined that there is an abnormality in the hydraulic pressure sensor, even though the secondary pressure supplied to the secondary pulley is reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a view showing one example in which the secondary pressure is reduced, due to a problem of a secondary pressure electromagnetic control valve of FIG. 4;

FIG. 7 is a view showing one example in which the secondary pressure indicated by a hydraulic pressure sensor is reduced, due to a problem of the hydraulic pressure sensor of FIG. 4;

FIG. 8 is a view showing one example in which the speed ratio indicates a large value, when a command for the primary pressure is not generated, in FIG. 4;

DETAILED DESCRIPTION OF EMBODIMENTS

Figure 1:
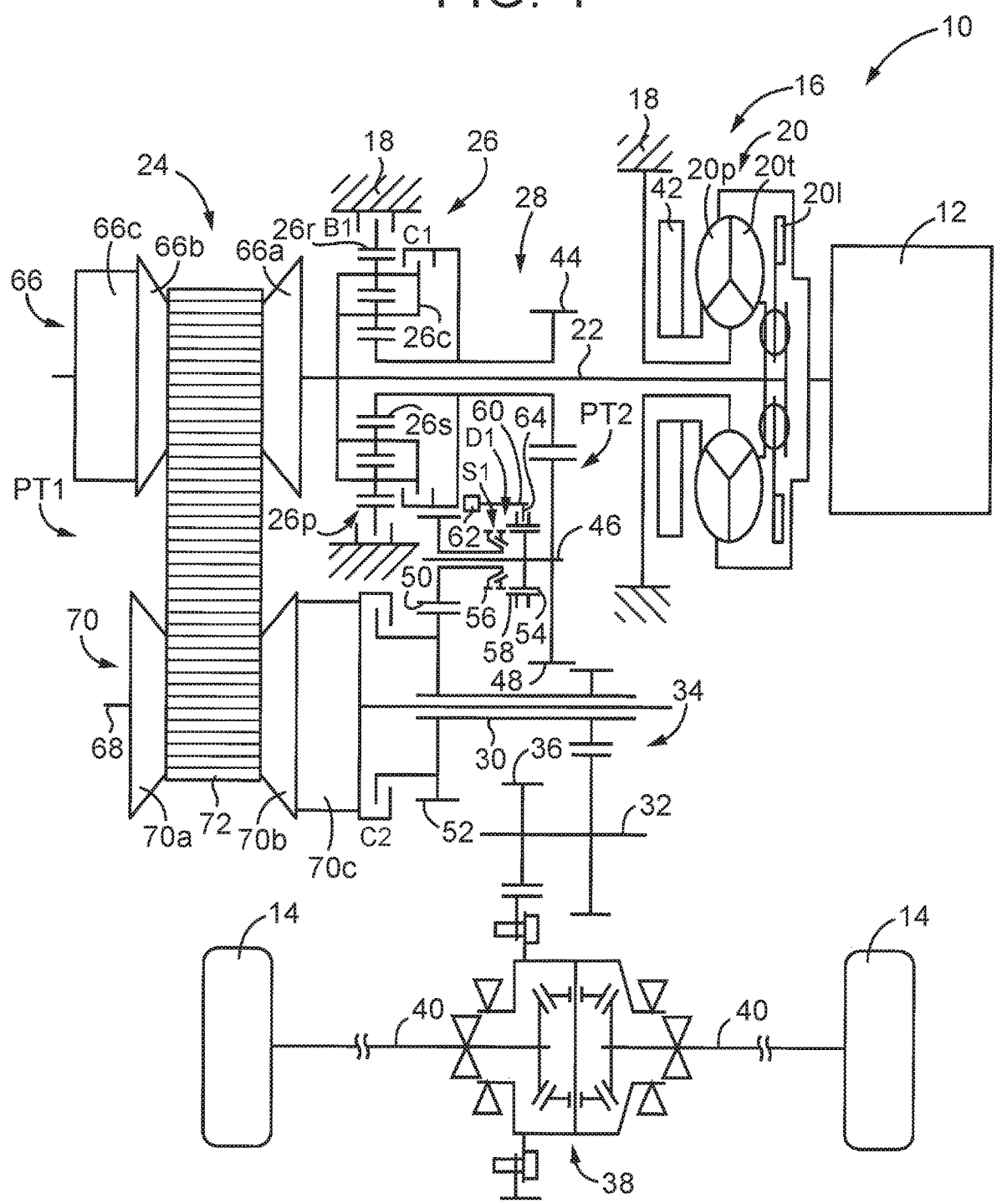
FIG. 1 is a skeleton diagram illustrating the general configuration of a vehicle to which the disclosure is applied.

One embodiment of the disclosure will be described in detail with reference to the drawings. In the following embodiment, parts or components shown in the drawings are simplified or deformed as needed, and the ratio of dimensions, shapes, etc. of the respective parts or components are not necessarily accurately illustrated.

FIG. 1 shows the general configuration of a vehicle 10 to which the disclosure is applied. In FIG. 1, the vehicle 10 includes an engine 12, such as a gasoline engine or a diesel engine, which functions as a drive power source for traveling, drive wheels 14, and a power transmission system 16 provided between the engine 12 and the drive wheels 14. The power transmission system 16 includes a torque converter 20 as a fluid-type transmission device coupled to the engine 12, an input shaft 22 coupled to the torque converter 20, a continuously variable transmission (which will be called "CVT") 24 coupled to the input shaft 22, a forward/reverse drive switching device 26 also coupled to the input shaft 22, and a gear transmission mechanism 28 connected to the input shaft 22 via the forward/reverse drive switching device 26. The gear transmission mechanism 28 is provided in parallel with the CVT 24, and has at least one gear ratio. The power transmission system 16 further includes an output shaft 30 as a common output rotating member of the CVT 24 and the gear transmission mechanism 28, a countershaft 32, a reduction gear device 34, a differential gear 38, a pair of axles 40 coupled to the differential gear 38, and so forth. The reduction gear device 34 consists of a pair of meshing gears that are relatively non-rotatably provided on the output shaft 30 and the countershaft 32, respectively. The differential gear 38 is coupled to a gear 36 that is relatively non-rotatably provided on the countershaft 32. The above-indicated components of the power transmission system 16 are housed in a housing 18 as a non-rotary member. In the power transmission system 16 thus constructed, power (which is equivalent to torque or force when they are not particularly distinguished from each other) of the engine 12 is transmitted to the pair of drive wheels 14, via the torque converter 20, the CVT 24 or the forward/reverse drive switching device 26 and gear transmission mechanism 28, reduction gear device 34, differential gear 38, axles 40, and so forth, in the order of description.

Thus, the power transmission system 16 includes the gear transmission mechanism 28 as a first speed change unit and the CVT 24 as a second speed change unit, which are provided in parallel between the engine 12 (equivalent to the input shaft 22 as an input rotating member to which power of the engine 12 is transmitted), and the drive wheels 14 (equivalent to the output shaft 30 as an output rotating member that delivers power of the engine 12 to the drive wheels 14). Thus, the power transmission system 16 includes two or more power transmission paths PT, i.e., a second power transmission path PT2 through which power of the engine 12 is transmitted to the drive wheels 14 side (i.e., to the output shaft 30) via the gear transmission mechanism 28, and a first power transmission path PT1 through which power of the engine 12 is transmitted to the drive wheels 14 side (i.e., to the output shaft 30) via the CVT 24, such that these paths PT1, PT2 are arranged in parallel between the input shaft 22 and the output shaft 30. In the power transmission system 16, the power of the engine 12 is transmitted through one of the first power transmission path PT1 and the second power transmission path PT2, which is selected according to traveling conditions of the vehicle 10. To this end, the power transmission system 16 includes two or more engagement devices that switch the power transmission path PT through which the power of the engine 12 is transmitted to the drive wheels 14 side, between the first power transmission path PT1 and the second power transmission path PT2. The engagement devices include a clutch C2 for the CVT (which corresponds to the continuously variable transmission connecting and disconnecting device of the disclosure, and will be called "clutch for CVT") which connects and disconnects the first power transmission path PT1, and a clutch C1 for gears (which corresponds to the gear transmission mechanism connecting and disconnecting device of the disclosure, and will be called "clutch for gears") which connects and disconnects the second power transmission path PT2.

The torque converter 20 is disposed around the input shaft 22, coaxially with the input shaft 22, and includes a pump impeller 20p coupled to the engine 12, and a turbine wheel 20t coupled to the input shaft 22. A lock-up clutch 201 is provided between the pump impeller 20p and the turbine wheel 20t. A mechanical oil pump 42, which is coupled to the pump impeller 20p, is rotated/driven by the engine 12 so as to generate a hydraulic pressure for performing shift control on the CVT 24, operating the engagement devices, and supplying lubricating oil to respective parts of the power transmission system 16, and supply the hydraulic pressure to a hydraulic control circuit 82. While the engine 12 is in operation, output torque of the engine 12 is constantly applied to the input shaft 22 via the torque converter 20.

The forward/reverse drive switching device 26 is provided around the input shaft 22 in the second power transmission path PT2, coaxially with the input shaft 22, and includes a double pinion type planetary gear unit 26p, clutch C1 for gears, and first brake B1. The planetary gear unit 26p is a differential mechanism having three rotating elements, i.e., a carrier 26c as an input element, a sun gear 26s as an output element, and a ring gear 26r as a reaction force element. The carrier 26c is integrally coupled to the input shaft 22, and the ring gear 26r is selectively coupled to the housing 18 via the first brake B1, while the sun gear 26s is coupled to a small-diameter gear 44 that is provided around the input shaft 22, coaxially with the input shaft 22, such that it can rotate relative to the input shaft 22. The carrier 26c and the sun gear 26s are selectively coupled to each other via the clutch C1 for gears. Thus, the clutch C1 for gears is an engagement device for selectively engaging two rotating elements, among the above-indicated three rotating elements, for forward gear traveling, and the first brake B1 is an engagement device that selectively engages the ring gear 26r as the reaction force element with the housing 18, for reverse traveling.

The gear transmission mechanism 28 includes the small-diameter gear 44, and a large-diameter gear 48 that is provided around a gear mechanism countershaft 46, coaxially with the countershaft 46, such that the gear 48 cannot rotate relative to the countershaft 46, and meshes with the small-diameter gear 44. The gear transmission mechanism 28 also includes an idler gear 50 that is relatively rotatably provided around the gear mechanism countershaft 46, coaxially with the countershaft 46, and an output gear 52 that is relatively non-rotatably provided around the output shaft 30, coaxially with the output shaft 30, and meshes with the idler gear 50. The output gear 52 has a larger diameter than the idler gear 50. With the gear transmission mechanism 28 provided on the power transmission path PT between the input shaft 22 and the output shaft 30, one speed ratio (gear position) is established or formed as a predetermined speed ratio of the gear transmission mechanism 28. Furthermore, a dog clutch D1 is provided around the gear mechanism countershaft 46, between the large-diameter gear 48 and the idler gear 50, for selectively connecting or disconnecting the large-diameter gear 48 with or from the idler gear 50. The dog clutch D1 functions as a third engagement device that is included in the power transmission system 16 and placed in the second power transmission path PT2 between the forward/reverse drive switching device 26 (equivalent to the clutch C1 for gears) and the output shaft 30, for connecting or disconnecting the second power transmission path PT2. The dog clutch D1 is one of the above-mentioned engagement devices. The dog clutch D1 is provided closer to the output shaft 30 than the clutch C1 for gears. The second power transmission path PT2 is formed when the dog clutch D1 as the third engagement device and the clutch C1 for gears are both engaged.

More specifically, the dog clutch D1 includes a clutch hub 54, clutch gear 56, and cylindrical sleeve 58. The clutch hub 54 is provided around the gear mechanism countershaft 46, coaxially with the countershaft 46, such that the clutch hub 54 cannot rotate relative to the countershaft 46. The clutch gear 56 is disposed between the idler gear 50 and the clutch hub 54, and is fixed to the idler gear 50. The sleeve 58 is spline-fitted on the clutch hub 54, such that the sleeve 58 cannot rotate relative to the clutch hub 54 about the axis of the gear mechanism countershaft 46, and can move relative to the clutch hub 54 in a direction parallel to the same axis. When the sleeve 58 that is constantly rotated as a unit with the clutch hub 54 is moved toward the clutch gear 56, to be engaged with the clutch gear 56, the idler gear 50 and the gear mechanism countershaft 46 are connected to each other. Further, the dog clutch D1 includes a known synchromesh mechanism S1 as a synchronization mechanism, which serves to synchronize rotation when the sleeve 58 is engaged with the clutch gear 56. The dog clutch D1 constructed as described above is switched between an engaged state and a released state, when a fork shaft 60 is operated by a hydraulic actuator 62, so that the sleeve 58 slides in a direction parallel to the axis of the gear mechanism countershaft 46, via a shift fork 64 fixed to the fork shaft 60.

The second power transmission path PT2 is formed when the dog clutch D1 and the clutch C1 for gears (or the first brake B) provided closer to the input shaft 22 than the dog clutch D1 are both engaged. A forward-drive power transmission path is formed when the clutch C1 for gears is engaged, and a reverse-drive power transmission path is formed when the first brake B1 is engaged. In the power transmission system 16, when the second power transmission path PT2 is formed, it is placed in a power transmittable state in which power of the engine 12 can be transmitted from the input shaft 22 to the output shaft 30 via the gear transmission mechanism 28. The speed ratio γgear (which will be called "gear speed ratio") of the second power transmission path PT2 is set to a speed ratio that is larger than the maximum speed ratio γmax, i.e., the maximum value of the speed ratio γcvt (which will be called "CVT speed ratio") of the first power transmission path PT1. On the other hand, when at least the clutch C1 for gears and the first brake B1 are both released, or at least the dog clutch D1 is released, the second power transmission path PT2 is placed in a power transmission interruption state.

The CVT 24 includes a primary pulley (primary sheave) 66 having a variable effective diameter and provided on the input shaft 22 that rotates with the engine 12, a secondary pulley (secondary sheave) 70 having a variable effective diameter and provided on a rotary shaft 68 having the same axis as the output shaft 30, and a transmission belt 72 that is looped around the pulleys 66, 70, and corresponds to the transmission element of the disclosure. The CVT 24 transmits power via frictional force (belt clamping force) between each of the pulleys 66, 70 and the transmission belt 72. In the primary pulley 66, a sheave hydraulic pressure (i.e., a primary pressure Pp supplied to a primary-side hydraulic actuator 66c) supplied to the primary pulley 66 is regulated or controlled by a hydraulic control circuit 82 (see FIG. 3) driven by an electronic control unit 90 (see FIG. 3), so that a primary thrust Win (=primary pressure Pp×pressure receiving area) is provided for changing the width of a V groove between a fixed sheave 66a and a movable sheave 66b. In the secondary pulley 70, a sheave hydraulic pressure (i.e., a secondary pressure Ps supplied to a secondary-side hydraulic actuator 70c) supplied to the secondary pulley 70 is regulated or controlled by the hydraulic control circuit 82, so that a secondary thrust Wout (=secondary pressure Pp×pressure receiving area) is provided for changing the width of a V groove between a fixed sheave 70a and a movable sheave 70b. In the CVT 24, the primary thrust Win (primary pressure Pp) and the secondary thrust Wout (secondary pressure Ps) are respectively controlled, so that the width of the V groove of each pulley 66, 70 is changed, and the engaging diameter (effective diameter) of the transmission belt 72 is changed. As a result, the CVT speed ratio γcvt (=primary pulley rotational speed Np/secondary pulley rotational speed Ns) is changed, and the frictional force between each pulley 66, 70 and the transmission belt 72 is controlled so that no slip occurs to the transmission belt 72.

The output shaft 30 is disposed around the rotary shaft 68, coaxially with the rotary shaft 68, such that the output shaft 30 can rotate relative to the rotary shaft 68. The clutch C2 for CVT is provided closer to the drive wheels 14 (equivalent to the output shaft 30) than the CVT 24 (namely, provided between the secondary pulley 70 and the output shaft 30), and selectively connects or disconnects the secondary pulley 70 (rotary shaft 68) with or from the output shaft 30. The first power transmission path PT1 is formed by engaging the clutch C2 for CVT. In the power transmission system 16, when the first power transmission path PT1 is formed, it is placed in a power transmittable state in which power of the engine 12 can be transmitted from the input shaft 22 to the output shaft 30 via the CVT 24. On the other hand, when the clutch C2 for CVT is released, the first power transmission path PT1 is placed in a neutral state.

Figure 2:
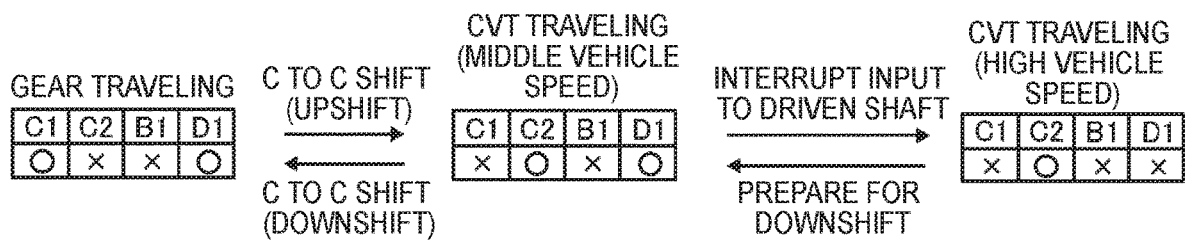
FIG. 2 is a view useful for describing switching of traveling patterns of a power transmission system.

Operation of the power transmission system 16 will be described below. FIG. 2 is a view useful for describing switching of traveling patterns (traveling modes) of the power transmission system 16, using an engagement table of the engagement devices for each of the travelling patterns switched by the electronic control unit 90. In FIG. 2, "C1" corresponds to an operating state of the clutch C1 for gears, "C2" corresponds to an operating state of the clutch C2 for CVT, "B1" corresponds to an operating state of the first brake B1, and "D1" corresponds to an operating state of the dog clutch D1. In FIG. 2, "O" indicates an engaged (connected) state, and "x" indicates a released (disconnected) state.

Figure 3:
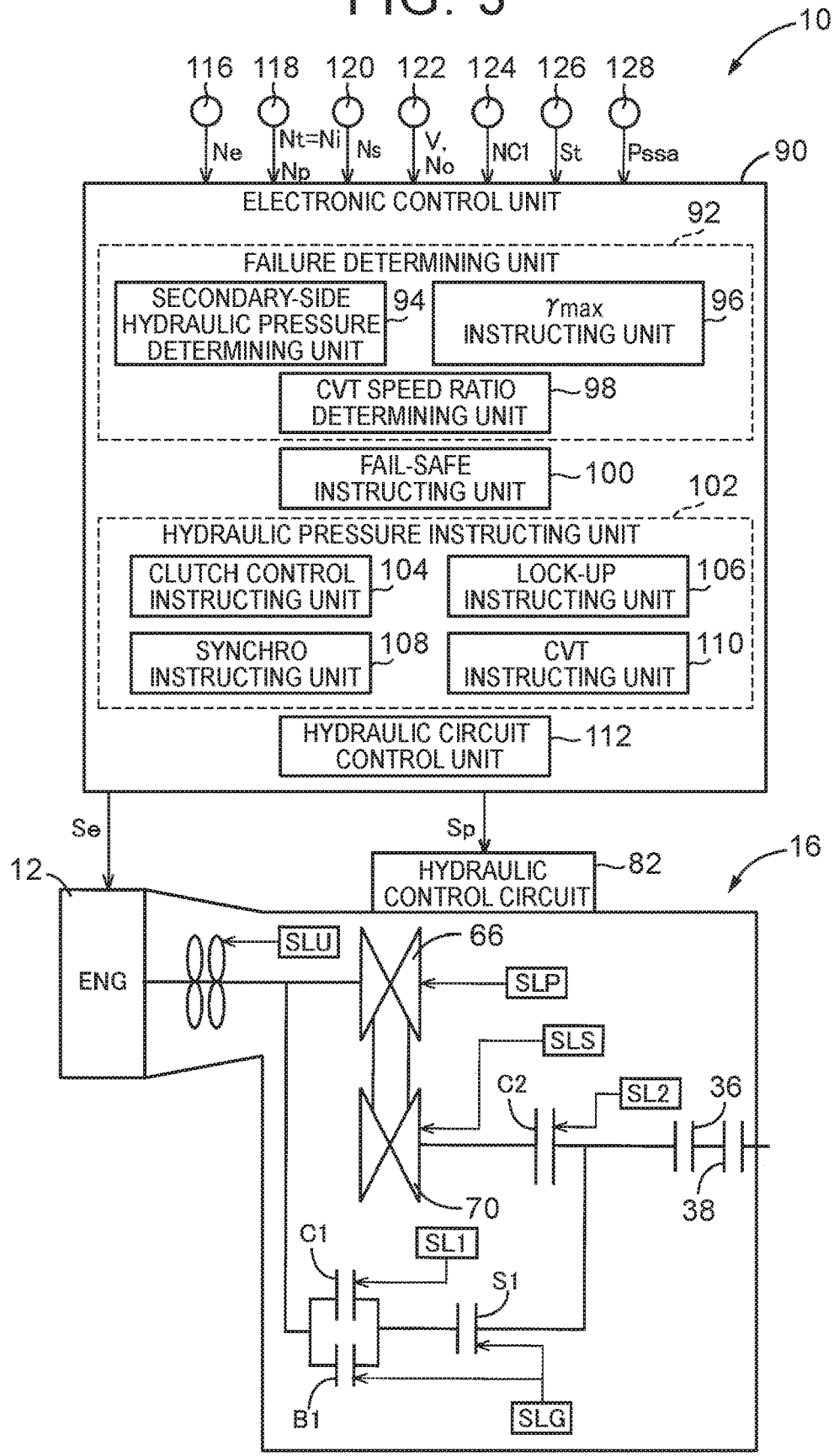
FIG. 3 is a view illustrating the general configuration of electromagnetic control valves that supply hydraulic pressures in connection with traveling of the vehicle of FIG. 1, and is also a view illustrating a principal part of a control system for controlling respective parts of the vehicle.

FIG. 3 is a view useful for describing control functions and a principal part of a control system for various controls performed in the vehicle 10. In FIG. 3, the vehicle 10 includes the electronic control unit 90. FIG. 3 shows an input/output system of the electronic control unit 90, and also includes a functional block diagram illustrating a principal part of control functions performed by the electronic control unit 90. For example, the electronic control unit 90 includes a so-called microcomputer including a central processing unit (CPU), random access memory (RAM), read-only memory (ROM), input-output interface, etc., and the CPU performs signal processing according to programs stored in advance in the ROM, while utilizing the temporary storage function of the RAM, so as to perform various controls on the vehicular power transmission system 16. For example, the electronic control unit 90 performs output control of the engine 12, shift control of the CVT 24, traveling pattern switching control of the power transmission system 16, and so forth. The electronic control unit 90 may be divided into and constituted by sub-units for engine control, hydraulic control, etc., as needed.

The electronic control unit 90 is supplied with various actual values based on detection signals of various sensors included in the vehicle 10. The sensors include various rotational speed sensors 116, 118, 120, 122, 124, a stroke sensor 126 that detects a position St to which the sleeve 58 is moved when the sleeve 58 is engaged with the clutch gear 56, a secondary-side hydraulic pressure sensor 128 that detects the secondary pressure Ps supplied to the secondary-side hydraulic actuator 70c, and so forth. The above-mentioned actual values include, for example, the engine speed Ne (rpm), primary pulley rotational speed Np (rpm) also called the turbine speed Nt (rpm) and the input shaft speed Nin (rpm), secondary pulley rotational speed Ns (rpm), output shaft speed No (rpm) corresponding to the vehicle speed V, gear clutch rotational speed Nc1 (rpm), actual pressure Pssa (Mpa) as a hydraulic pressure obtained by the secondary-side hydraulic pressure sensor, moving distance St (mm) of the sleeve 58, and so forth. Also, the electronic control unit 90 outputs an engine output control command signal Se for output control of the engine 12, hydraulic control circuit command signal Sp to the hydraulic control circuit 82 that controls change of the speed of the CVT 24, and controls the clutch C1 for gears and clutch C2 for CVT, for controlling switching between the first power transmission path PT1 and the second power transmission path PT2, lock-up clutch 201, and so forth.

The vehicular power transmission system 16 shown in FIG. 3 includes various electromagnetic control valves that constitute the hydraulic control circuit 82. The electromagnetic control valves include an electromagnetic control valve for the primary pulley (which will be called "linear solenoid valve SLP") which controls the hydraulic pressure supplied to the primary pulley 66, electromagnetic control valve for the secondary pulley (which will be called "linear solenoid valve SLS") which controls the hydraulic pressure supplied to the secondary pulley 70, lock-up clutch electromagnetic control valve (which will be called "linear solenoid valve SLU") which controls the hydraulic pressure supplied to the lock-up clutch 201, electromagnetic control valve for the clutch for gears (which will be called "linear solenoid valve SL1") which controls the hydraulic pressure supplied to the clutch C1 for gears, electromagnetic control valve for the clutch for CVT (which will be called "linear solenoid valve SL2") which controls the hydraulic pressure supplied to the clutch C2 for CVT, electromagnetic control valve for synchro (which will be called "linear solenoid valve SLG") which controls the hydraulic pressure supplied to the first brake B1 and the synchromesh mechanism S1, and so forth. The arrangement of these electromagnetic control valves, and the primary pulley 66, secondary pulley 70, various clutches C1, B1, S1, etc. controlled by these valves is schematically illustrated in FIG. 3.

Figure 4:
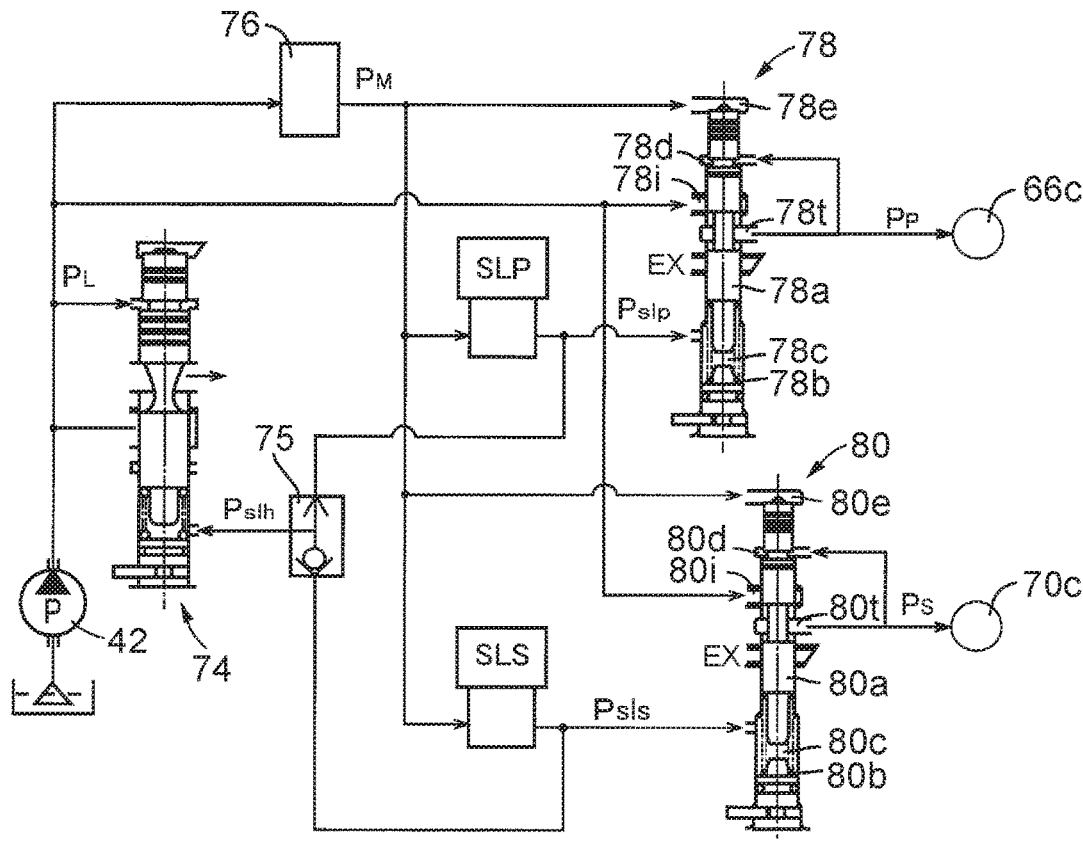
FIG. 4 is a view schematically showing a hydraulic circuit that supplies a primary pressure and a secondary pressure, in a hydraulic control circuit of FIG. 3.

FIG. 4 is one example of a hydraulic circuit diagram showing a principal part of hydraulic control in connection with change of the speed of the CVT 24, as a part of the hydraulic control circuit 82. In FIG. 4, the hydraulic control circuit 82 includes the oil pump 42, a primary pressure control valve 78 that adjusts the primary pressure Pp, secondary pressure control valve 80 that adjusts the secondary pressure Ps, primary regulator valve (line pressure regulating valve) 74, modulator valve 76, linear solenoid valve SLP, linear solenoid valve SLS, shuttle valve 75, and so forth.

For example, the line pressure PL is adjusted by the primary regulator valve 74 of relief type, to a value commensurate with the engine load, etc., using a hydraulic pressure generated from the oil pump 42 as an original pressure, based on an oil pressure Pslh as the higher one of a command pressure Pslp of the linear solenoid valve SLP and a command pressure Psls of the linear solenoid valve SLS, which is received via the shuttle valve 75. More specifically, the line pressure PL is set to a hydraulic pressure obtained by adding a given margin to the higher oil pressure of the primary pressure Pp and the secondary pressure Ps, and is adjusted based on the command pressure Pslh. Accordingly, it is possible to avoid shortage of the line pressure PL as the original pressure in pressure regulating operation of the primary pressure control valve 78 and the secondary pressure control valve 80, and also prevent the line pressure PL from being unnecessarily high. Also, a modulator pressure PM provides an original pressure of each of the command pressure Pslp as an output hydraulic pressure of the linear solenoid valve SLP, and the command pressure Psls as an output hydraulic pressure of the linear solenoid valve SLS. The modulator valve 76 adjusts the modulator pressure PM to a given pressure, using the line pressure PL as the original pressure.

The primary pressure control valve 78 includes a spool valve body 78a, spring 78b, oil chamber 78c, feedback oil chamber 78d, and oil chamber 78e. The spool valve body 78a, which is movable in the axial direction, opens and closes an input port 78i, so that the line pressure PL can be supplied from the input port 78i to the primary pulley 66 via an output port 78t. The spring 78b serves as a biasing means for biasing the spool valve body 78a in a valve-opening direction. The oil chamber 78c, in which the spring 78b is housed, receives the command pressure Pslp for applying thrust to the spool valve body 78a in the valve-opening direction. The feedback oil chamber 78d receives the primary pressure Pp delivered from the output port 78t so as to apply thrust to the spool valve body 78a in a valve-closing direction. The oil chamber 78e receives the modulator pressure PM so as to apply thrust to the spool valve body 78a in the valve-closing direction. The primary pressure control valve 78 thus constructed adjusts the line pressure PL, using the command pressure Pslp as a pilot pressure, and supplies the resulting pressure to the primary-side hydraulic actuator 66c of the primary pulley 66. In this manner, the primary pressure Pp supplied to the primary-side hydraulic actuator 66c is controlled. For example, if the command pressure Pslp delivered from the linear solenoid valve SLP increases, from a condition where a given hydraulic pressure is supplied to the primary-side hydraulic actuator 66c, the spool valve body 78a of the primary pressure control valve 78 moves upward in FIG. 4. As a result, the primary pressure Pp applied to the primary-side hydraulic actuator 66c is increased. On the other hand, if the command pressure Pslp delivered from the linear solenoid valve SLP is reduced, from the condition where a given hydraulic pressure is supplied to the primary-side hydraulic actuator 66c, the spool valve body 78a of the primary pressure control valve 78 moves downward in FIG. 4. As a result, the primary pressure Pp applied to the primary-side hydraulic actuator 66c is reduced.

The secondary pressure control valve 80 includes a spool valve body 80a, spring 80b, oil chamber 80c, feedback oil chamber 80d, and oil chamber 80e. The spool valve body 80a, which is movable in the axial direction, opens and closes an input port 80i, so that the line pressure PL can be supplied as the secondary pressure Ps from the input port 80i to the secondary pulley 70 via an output port 80t. The spring 80b serves as a biasing means for biasing the spool valve body 80a in a valve-opening direction. The oil chamber 80c, in which the spring 80b is housed, receives the command pressure Psls for applying thrust to the spool valve body 80a in the valve-opening direction. The feedback oil chamber 80d receives the secondary pressure Ps delivered from the output port 80t so as to apply thrust to the spool valve body 80a in a valve-closing direction. The oil chamber 80e receives the modulator pressure PM so as to apply thrust to the spool valve body 80a in the valve-closing direction. The secondary pressure control valve 80 thus constructed adjusts the line pressure PL, using the command pressure Psls as a pilot pressure, for example, and supplies the resulting pressure to the secondary-side hydraulic actuator 70c of the secondary pulley 70. In this manner, the secondary pressure Ps supplied to the secondary-side hydraulic actuator 70c is controlled. For example, if the command pressure Psls delivered from the linear solenoid valve SLS increases, from a condition where a given hydraulic pressure is supplied to the secondary-side hydraulic actuator 70c, the spool valve body 80*a* of the secondary pressure control valve 80 moves upward in FIG. 4. As a result, the secondary pressure Ps applied to the secondary-side hydraulic actuator 70*c* is increased. On the other hand, if the command pressure Psls delivered from the linear solenoid valve SLS is reduced, from the condition where a given hydraulic pressure is supplied to the secondary-side hydraulic actuator 70*c*, the spool valve body 80*a* of the secondary pressure control valve 80 moves downward in FIG. 4. As a result, the secondary pressure Ps applied to the secondary-side hydraulic actuator 70*c* is reduced. The electronic control unit 90 outputs the hydraulic control circuit command signal Sp, so that a desired hydraulic pressure is supplied to the secondary-side hydraulic actuator 70*c*, and the linear solenoid valve SLS controls the secondary pressure control valve 80, using the command pressure Psls, so that the desired secondary pressure Ps is supplied to the secondary-side hydraulic actuator 70*c*.

Figure 5:
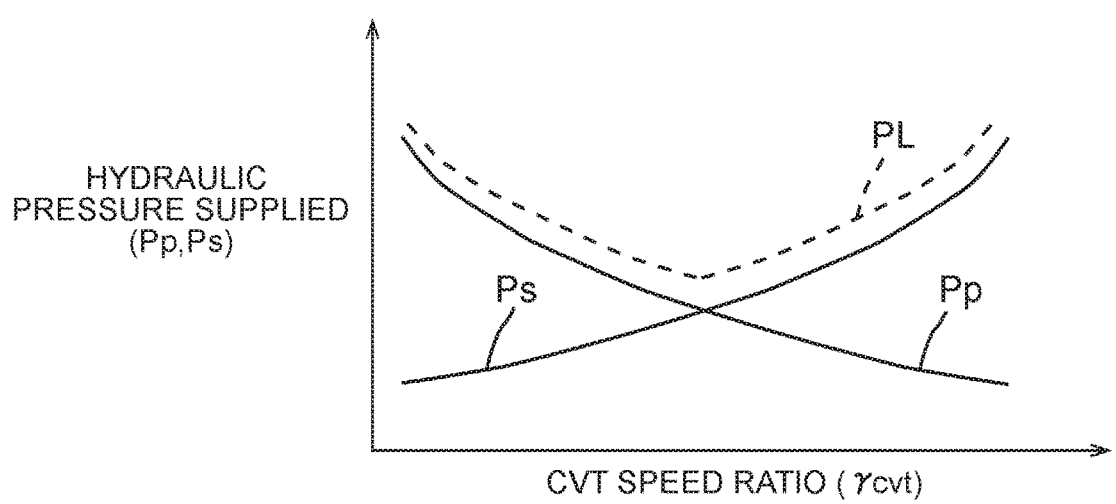
FIG. 5 is a view indicating the relationship between the speed ratio, and the primary pressure, secondary pressure, and line pressure, in a simplified form.

FIG. 5 schematically shows how the line pressure PL, primary pressure Pp as a hydraulic pressure supplied to the primary pulley 66, and secondary pressure Ps as a hydraulic pressure supplied to the secondary pulley 70 are controlled in accordance with the CVT speed ratio γcvt. As described above, the line pressure PL is set to a hydraulic pressure obtained by adding a given margin to the higher one of the primary pressure Pp and the secondary pressure Ps, and is adjusted based on the command pressure Pslh.

Referring back to FIG. 3, function blocks describing a principal part of control functions performed by the electronic control unit 90 are indicated within the electronic control unit 90. A failure determining unit 92 surrounded by a broken line consists of a secondary-side hydraulic pressure determining unit 94, γmax instructing unit 96, and CVT speed ratio determining unit 98. The secondary-side hydraulic pressure determining unit 94 of the failure determining unit 92 determines whether the vehicle is traveling in a belt traveling mode using the CVT 24, by determining whether the command pressure Psls delivered from the linear solenoid valve SLS to the secondary-side hydraulic actuator 70*c* is larger than a predetermined value Pa stored in advance, for example. When the vehicle is in the belt traveling mode, the secondary-side hydraulic pressure determining unit 94 determines whether a difference between the secondary pressure Ps normally delivered based on the command pressure Psls delivered from the linear solenoid valve SLS, and an actual pressure Pssa in the secondary-side hydraulic actuator 70*c* obtained by the secondary-side hydraulic pressure sensor 128, is larger than a predetermined value Psa. When the difference between the secondary pressure Ps normally delivered based on the command pressure Psls delivered from the linear solenoid valve SLS and the actual pressure Pssa in the secondary-side hydraulic actuator 70*c* obtained by the secondary-side hydraulic pressure sensor 128 is larger than the predetermined value Psa, the secondary-side hydraulic pressure determining unit 94 determines that there is a belt clamping force reduction abnormality, namely, the clamping force between each pulley 66, 70 and the transmission belt 72 is abnormally reduced. The γmax instructing unit 96 releases the clutch C2 for CVT, so as to disconnect the first power transmission path PT1, and switch the vehicle 10 to a neutral traveling mode, and set the command pressure Pslp of the linear solenoid valve SLP and the command pressure Psls of the linear solenoid valve SLS so as to establish predetermined primary pressure Pp and secondary pressure Ps with which the CVT speed ratio γcvt of the CVT 24 becomes equal to the maximum value, namely, the maximum speed ratio γmax. When the speed ratio γcvt of the CVT 24 is smaller than a first speed change determination valve γpa that is determined in advance as a value slightly larger than γmin, for example, the CVT speed ratio determining unit 98 determines that there is an abnormality in the linear solenoid valve SLS, namely, an ON failure occurs such that the command value Psls of the linear solenoid valve SLS is reduced. Also, when the speed ratio γcvt of the CVT 24 is larger than a second determination value γpb that is determined in advance as a value slightly smaller than γmax, for example, the CVT speed ratio determining unit 98 determines that there is an abnormality in the secondary-side hydraulic pressure sensor 128. The first determination value γpa and the second determination value γpb may not be set to different values, but the same value may be used as the determination values. The determination as to which of the linear solenoid valve SLS and the secondary-side hydraulic pressure sensor 128 has an abnormality may be similarly made in vehicles other than the vehicle 10 having the first power transmission path PT1 and the second power transmission path PT2 as shown in FIG. 1, for example, in a vehicle that does not include the second power transmission path PT2, but includes the first power transmission path PT1 through which power is transmitted via the CVT 24, and the clutch C2 for CVT which can shift the CVT 24 from a traveling state to a neutral state.

FIG. 6 shows one example of the primary pressure Pp, secondary pressure Ps, and their relationship, which are indicated when there is an abnormality in the linear solenoid valve SLS, in the abnormality determination as described above. In FIG. 6, the command pressure Pslp as a control hydraulic pressure of the linear solenoid valve SLP is indicated on the bar indicating the primary pressure Pp, and the command pressure Psls as a control hydraulic pressure of the linear solenoid valve SLS is indicated on the bar indicating the secondary pressure Ps. The command pressure Pslp of the linear solenoid valve SLP and the command pressure Psls of the linear solenoid valve SLS are set so that the CVT speed ratio γcvt of the CVT 24 becomes equal to the maximum speed ratio γmax as a predetermined maximum value, when the linear solenoid valve SLS and the linear solenoid valve SLP are in normal operation. Also, the command pressure Pslp of the linear solenoid valve SLP is set to be equal to or higher than a predetermined hydraulic pressure Pb. The predetermined hydraulic pressure Pb is set in advance, to a value that can avoid a situation where both of the command pressure Pslp of the linear solenoid valve SLP and the command pressure Psls of the linear solenoid valve SLS are reduced, and the CVT speed ratio γcvt indicates the maximum speed ratio γmax, whereby it is erroneously determined that there is an abnormality in the secondary-side hydraulic pressure sensor 128, even though there is an abnormality in the linear solenoid valve SLS, as shown in FIG. 8. In FIG. 6, the secondary pressure Ps is reduced by an amount corresponding to a hatched portion, due to an abnormality in the linear solenoid valve SLS, to be equal to the actual pressure Pssa as a hydraulic pressure obtained by the secondary-side hydraulic pressure sensor 128. As a result, the CVT speed ratio γcvt (=the primary pulley rotational speed Np/the secondary pulley rotational speed Ns) indicates γmin as its minimum value.

FIG. 7 shows one example of the primary pressure Pp, secondary pressure Ps, and their relationship, which are indicated when there is an abnormality in the secondary-side hydraulic pressure sensor 128, in the abnormality determination as described above. In FIG. 7, the command pressure Pslp of the linear solenoid valve SLP is indicated on the bar indicating the primary pressure Pp, and the command pressure Psls of the linear solenoid valve SLS is indicated on the bar indicating the secondary pressure Ps. The command pressure Pslp of the linear solenoid valve SLP and the command pressure Psls of the linear solenoid valve SLS are set so that the CVT speed ratio γcvt of the CVT 24 becomes equal to the maximum speed ratio γmax as a predetermined maximum value, when the linear solenoid valve SLS and the linear solenoid valve SLP are in normal operation. Also, the command pressure Pslp of the linear solenoid valve SLP is set to be equal to or higher than the predetermined hydraulic pressure Pb. When there is an abnormality in the secondary-side hydraulic pressure sensor 128, the command pressure Psls is generated even though the actual pressure Pssa, i.e., the hydraulic pressure obtained by the secondary-side hydraulic pressure sensor 128, is reduced. As a result, the CVT speed ratio γcvt (=the primary pulley rotational speed Np/the secondary pulley rotational speed Ns) indicates γmax as its maximum value.

FIG. 8 shows the case where the primary pressure Pp is not set to be equal to or higher than the predetermined hydraulic pressure Pb in the abnormality determination, unlike the cases of FIG. 6 and FIG. 7. In the case of FIG. 8, an erroneous determination may be made, even though there is an abnormality in the linear solenoid valve SLS. When both the command pressure Pslp of the linear solenoid valve SLP and the command pressure Psls of the linear solenoid valve SLS are reduced, the CVT speed ratio γcvt indicates the maximum speed ratio γmax even though there is an abnormality in the linear solenoid valve SLS; thus, it may be determined that there is an abnormality in the secondary-side hydraulic pressure sensor 128. Therefore, the command pressure Pslp of the linear solenoid valve SLP is set to be equal to or higher than the predetermined hydraulic pressure Pb, so as to prevent occurrence of the erroneous determination as described above.

Returning to the electronic control unit 90 of FIG. 3, once the failure determining unit 92 determines which of the linear solenoid valve SLS and the secondary-side hydraulic pressure sensor 128 has an abnormality, a fail-safe instructing unit 100 instructs a hydraulic pressure instructing unit 102 surrounded by a chain line, to select the gear traveling mode or the belt traveling mode, and set the primary pressure Pp and the secondary pressure Ps, for example. The hydraulic pressure instructing unit 102 consists of a clutch control instructing unit 104 that controls the clutch C1 for gears, clutch C2 for CVT, etc., a lock-up instructing unit 106 that controls the hydraulic pressure of the lock-up clutch 201, a synchro instructing unit 108 that controls the dog clutch D1, synchromesh mechanism S1, etc., and a CVT instructing unit 110 that controls the primary pressure Pp, secondary pressure Ps, etc. of the CVT 24. The hydraulic pressure instructing unit 102 performs fail-safe control of various hydraulic pressures. A hydraulic circuit control unit 112 sends a command signal Sp to the hydraulic control circuit 82, based on a command of the hydraulic pressure instructing unit 102, to control the linear solenoid valves SLP, SLS, etc.

Figure 9:
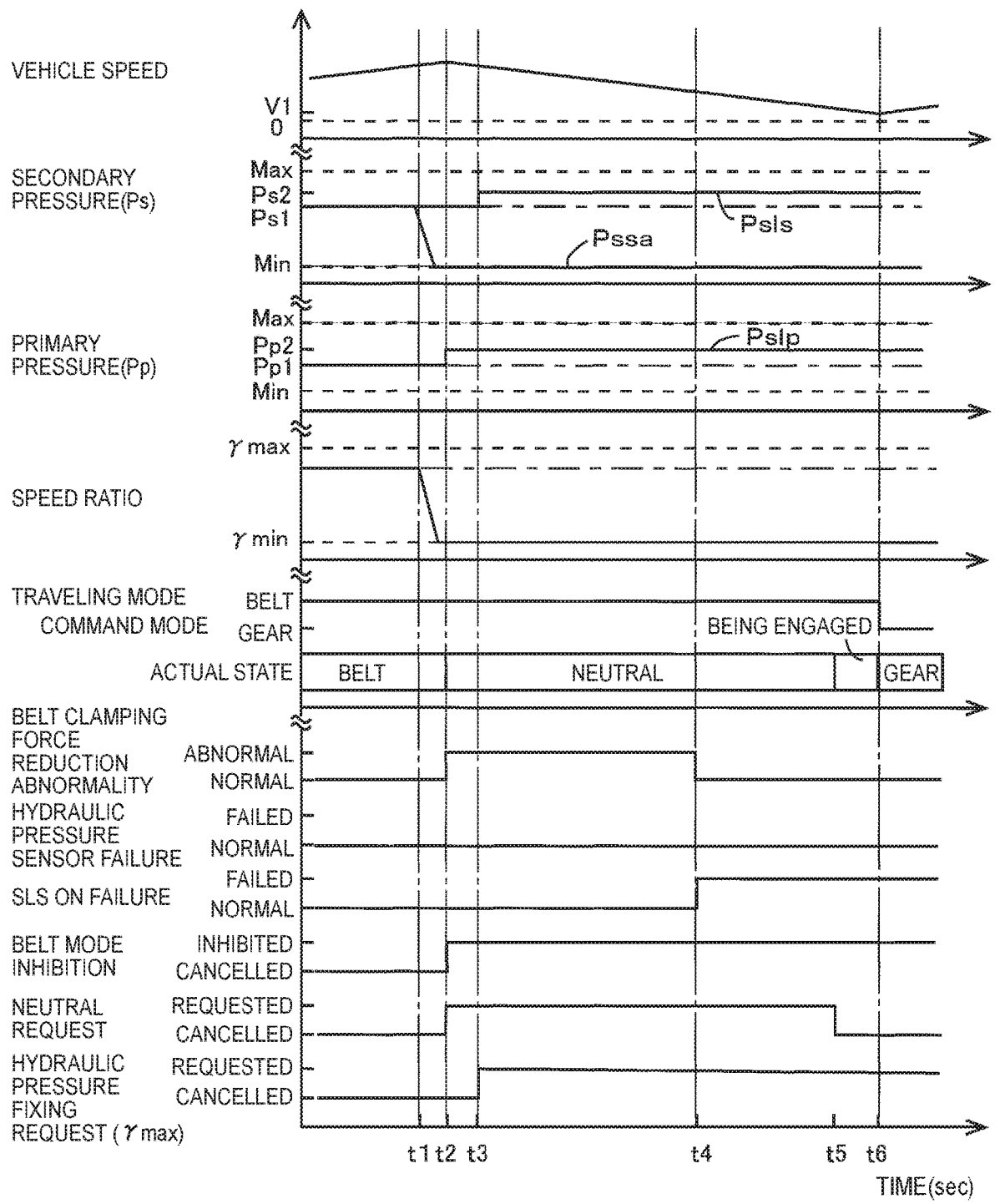
FIG. 9 is a time chart indicating one example of identification of a location having a problem, and selection of limp-home traveling after identification, when there is an abnormality that is reduction of the clamping force of a transmission element, due to a problem of the secondary pressure electromagnetic control valve of FIG. 4.

FIG. 9 shows a time chart indicating control operation of the electronic control unit 90 when there is an abnormality in the linear solenoid valve SLS. In this case, after an abnormality of the linear solenoid valve SLS is determined in neutral setting, the electronic control unit 90 switches the vehicle to the gear traveling mode. At time t1, the actual pressure Pssa as a measurement value of the secondary-side hydraulic pressure sensor 128 that measures the secondary pressure Ps is reduced from Ps1 corresponding to the command pressure Psls of the linear solenoid valve SLS. In the section of the secondary pressure Ps in FIG. 9, the actual pressure Pssa as the hydraulic pressure obtained by the secondary-side hydraulic pressure sensor 128 and the command pressure Psls as the control hydraulic pressure of the linear solenoid valve SLS are indicated. The primary pressure Pp is kept at Pp1. At time t2, a difference between Ps1 corresponding to the command pressure Psls of the linear solenoid valve SLS and the actual pressure Pssa is larger than the predetermined value Psa, and it is determined that there is a belt clamping force reduction abnormality. At the same time, the vehicle is inhibited from traveling in the belt traveling mode, namely, traveling with power transmitted via the CVT 24, and the clutch C2 for CVT is released so that the first power transmission path PT1 is disconnected. Thus, the vehicle is switched from the belt traveling mode to the neutral traveling mode. Also, the primary pressure Pp is increased to a primary pressure Pp2 corresponding to the command pressure Pslp of the linear solenoid valve SLP. As the primary pressure Pp2, the primary pressure Pp that ensures a line pressure PL that is not insufficient for engagement of the clutch C1 for gears, clutch C2 for CVT, synchromesh mechanism S1, etc., even in the case where the secondary pressure Ps is not generated, is stored and set in advance. At time t3, the secondary pressure Ps set in advance so that the CVT speed ratio γcvt becomes equal to the maximum speed ratio γmax, namely, the command pressure Psls of the linear solenoid valve SLS, is set to Ps2. While the primary pressure Pp is increased at time t2 in the example of FIG. 9, the primary pressure Pp may be increased at the same time as the secondary pressure Ps, namely, at time t3. The primary pressure Pp and secondary pressure Ps at and after time t3 may be obtained by adding given pressure values to the primary pressure Pp and secondary pressure Ps selected during belt traveling before time t1, for example, so as not to be influenced by engagement of the clutch C1 for gears, clutch C2 for CVT, synchromesh mechanism S1, etc.

At time t4, the CVT speed ratio γcvt does not increase from the minimum speed ratio γmin, even though the command pressure Psls of the linear solenoid valve SLS for the secondary pressure Ps is set to Ps2; therefore, the ON failure of the linear solenoid valve SLS is determined, and a signal indicating the belt clamping force reduction abnormality is cancelled. The determination using the CVT speed ratio γcvt may be made not only when the CVT speed ratio γcvt is the minimum speed ratio γmin, but also when it is smaller than a given speed ratio, e.g., the first determination value γpa. At time t5, switching from neutral to gear traveling, namely, switching to gear traveling using the second power transmission path PT2 is started by engaging the clutch C1 for gears and the dog clutch D1. At time t6, when the vehicle speed V reaches a vehicle speed V1 that is set in advance to about 2 km/h to 3 km/h., the vehicle is switched to gear traveling.

Figure 10:
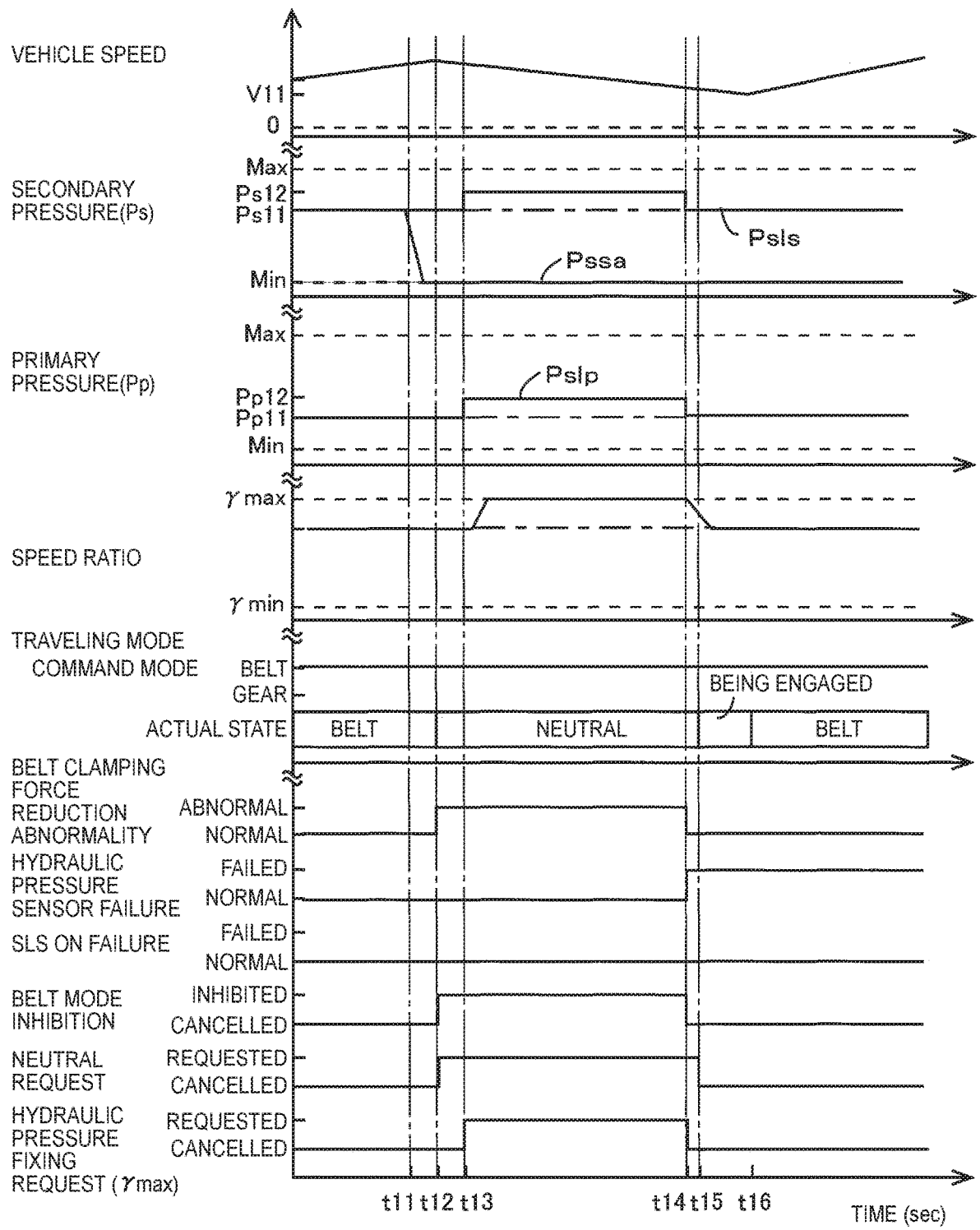
FIG. 10 is a time chart indicating one example of identification of a location having a problem, and selection of limp-home traveling after identification, when there is an abnormality that is reduction of the clamping fore of the transmission element, due to a problem of the hydraulic pressure sensor of FIG. 4.

FIG. 10 shows a time chart indicating control operation of the electronic control unit 90 when there is an abnormality in the secondary-side hydraulic pressure sensor 128. In this case, after an abnormality of the secondary-side hydraulic pressure sensor 128 is determined in neutral setting, the electronic control unit 90 switches the vehicle to the belt traveling mode, namely, traveling with power transmitted via the CVT 24. At time t11, the actual pressure Pssa as a measurement value of the secondary-side hydraulic pressure sensor 128 that measures the secondary pressure Ps is reduced from Ps11 corresponding to the command pressure Psls of the linear solenoid valve SLS. In the section of the secondary pressure Ps in FIG. 10, the actual pressure Pssa as a hydraulic pressure obtained by the secondary-side hydraulic pressure sensor 128 and the command pressure Psls as the control hydraulic pressure of the linear solenoid valve SLS are indicated. The primary pressure Pp is kept at Pp11. At time t12, a difference between Ps11 corresponding to the command pressure Psls of the linear solenoid valve SLS and the actual pressure Pssa is larger than the predetermined value Psa, and it is determined that there is a belt clamping force reduction abnormality. At the same time, the vehicle is inhibited from traveling in the belt traveling mode, namely, traveling with power transmitted via the CVT 24, and the clutch C2 for CVT is released so that the first power transmission path PT1 is disconnected. Thus, the vehicle is switched from the belt traveling mode to the neutral traveling mode. At time t13, the secondary pressure Ps is set to the secondary pressure Ps12 corresponding to the secondary pressure Psls of the linear solenoid valve SLS, namely, the secondary pressure Ps set in advance so that the CVT speed ratio γcvt becomes equal to the maximum speed ratio γmax, and the primary pressure Pp is set to the primary pressure Pp12 corresponding to the command pressure Pslp of the linear solenoid valve SLP, namely, the primary pressure Pp set in advance so that the CVT speed ratio γcvt becomes equal to the maximum speed ratio γmax. As the secondary pressure Ps12 and the primary pressure Pp12, pressures that are not influenced by engagement of the clutch C1 for gears, clutch C2 for CVT, synchromesh mechanism S1, etc. are selected. Also, the primary pressure Pp and secondary pressure Ps may be obtained by adding given pressure values to the primary pressure Pp and secondary pressure Ps selected during belt traveling before time t11, for example, so as not to be influenced by engagement of the clutch C1 for gears, clutch C2 for CVT, synchromesh mechanism S1, etc.

At time t14, the CVT speed ratio γcvt indicates the maximum speed ratio γmax; thus, a sensor pressure reduction abnormality, namely, reduction of the output of the secondary-side hydraulic pressure sensor 128, is determined, and a signal indicating the belt clamping force reduction abnormality is cancelled. Further, inhibition of the belt traveling mode is cancelled. The determination using the CVT speed ratio γcvt may be made not only when the CVT speed ratio γcvt is the maximum speed ratio γmax, but also when it is larger than a given speed ratio, e.g., a second determination value γpb. At time t15, engagement of the clutch C2 for CVT is started, when it is determined that the vehicle speed V is such a level (e.g., 80 km/h or lower) that does not cause over-revolution, namely, does not cause the engine speed Ne of the engine 12 to be excessively increased, or that the vehicle speed V is such a level that does not cause rapid reduction of the engine speed Ne. At time t16, the vehicle is switched to the belt traveling mode using the CVT 24. Thus, when there is a sensor pressure reduction abnormality as an abnormality in the secondary-side hydraulic pressure sensor 128, neutral traveling is interrupted in a short time, without continuing until the vehicle speed becomes equal to a low speed around 2 km/h to 3 km/h, for example, and the vehicle can be quickly switched to the belt traveling mode using the CVT 24, at vehicle speed V11.

Figure 11:
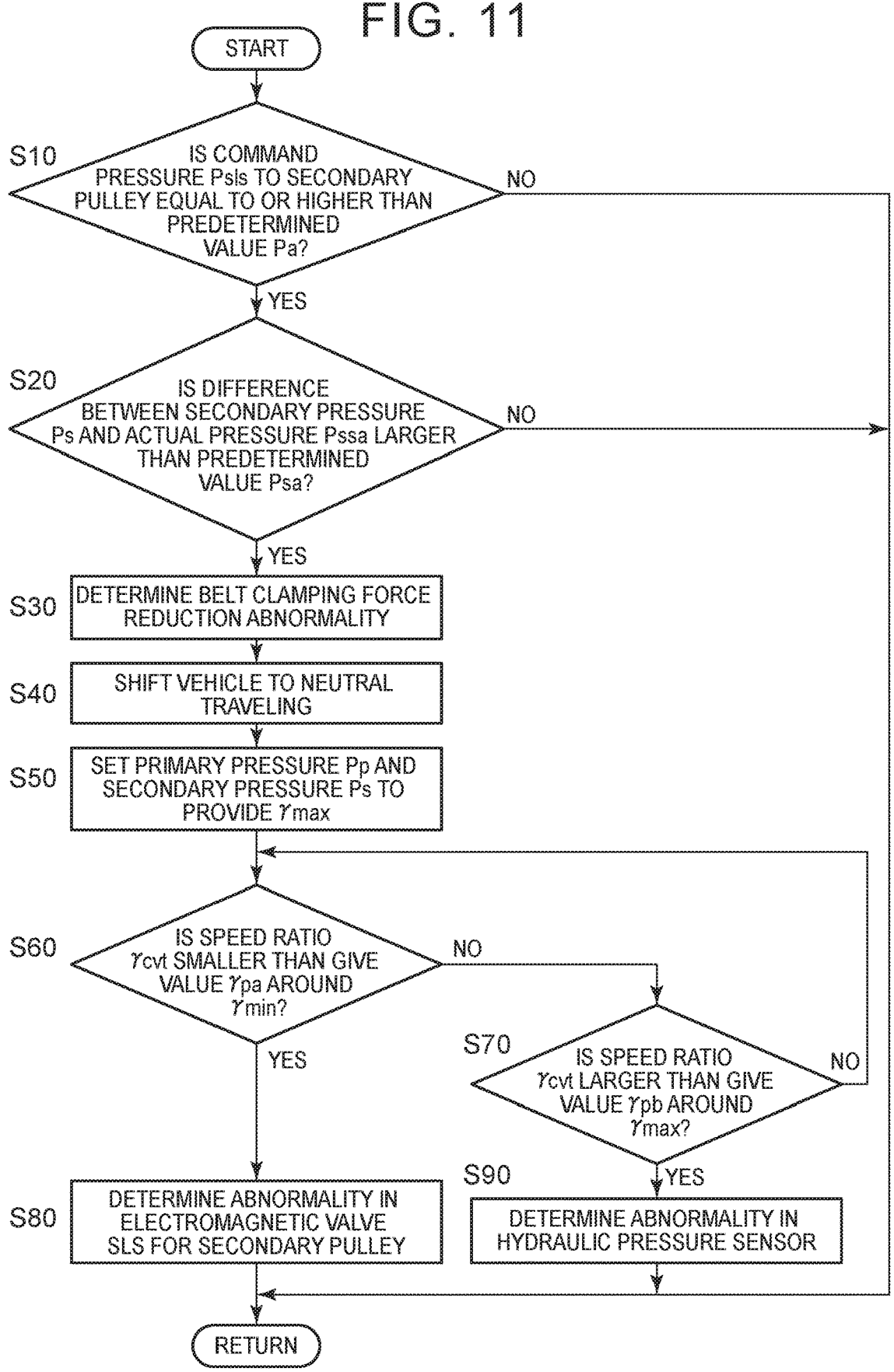
FIG. 11 is a flowchart illustrating one example of determination as to which of the secondary pressure electromagnetic control valve and the hydraulic pressure sensor has a problem, when there is an abnormality that is reduction of the clamping force of the transmission element.

FIG. 11 is a flowchart illustrating a principal part of control operation of the electronic control unit 90. In FIG. 11, in step S10 corresponding to a function of the secondary-side hydraulic pressure determining unit 94, it is determined whether the command pressure Psls supplied from the linear solenoid valve SLS to the secondary pulley 70 is equal to or higher than the predetermined value Pa. When a negative decision (NO) is obtained in step S10, step S10 is repeatedly executed. When an affirmative decision (YES) is obtained in step S10, step S20 corresponding to a function of the secondary-side hydraulic pressure determining unit 94 is executed. In step S20, it is determined whether a difference between the secondary pressure Ps corresponding to the command pressure Psls of the linear solenoid valve SLS and the actual pressure Pssa obtained by the secondary-side hydraulic pressure sensor 128 is larger than the predetermined value Psa. When a negative decision (NO) is obtained in step S20, steps S10 and S20 are repeatedly executed. When an affirmative decision (YES) is obtained in step S20, the presence of a belt clamping force reduction abnormality is determined, in step S30 corresponding to a function of the secondary-side hydraulic pressure determining unit 94. In step S40 corresponding to a function of the γmax instructing unit 96, the vehicle is shifted from traveling with the CVT 24, to the neutral traveling mode. In step S50 corresponding to a function of the γmax instructing unit 96, the primary pressure Pp and the secondary pressure Ps are set to the command pressure Pslp and command pressure Psls that are determined in advance so that the CVT speed ratio γcvt becomes equal to the maximum speed ratio γmax. In step S60 corresponding to a function of the CVT speed ratio determining unit 98, it is determined whether the CVT speed ratio γcvt is smaller than the first determination value γpa set to a value close to the minimum speed ratio γmin. When an affirmative decision (YES) is obtained in step S60, it is determined that there is an abnormality in the linear solenoid valve SLS, i.e., electromagnetic control valve SLS for the secondary pulley, in step S80 corresponding to a function of the CVT speed ratio determining unit 98. When a negative decision (NO) is obtained in step S60, it is determined whether the CVT speed ratio γcvt is larger than the second determination value γpb set to a value close to the maximum speed ratio γmax, in step S70 corresponding to a function of the CVT speed ratio determining unit 98. When a negative decision (NO) is obtained in step S70, steps S60 and S70 are repeatedly executed. When an affirmative decision (YES) is obtained in step S70, it is determined in step S90 corresponding to a function of the CVT speed ratio determining unit 98 that there is an abnormality in the secondary-side hydraulic pressure sensor 128.

According to this embodiment, the vehicular power transmission system 16 includes the CVT 24 that has the primary pulley 66, secondary pulley 70 and transmission belt 72 looped around the pulleys 66, 70, and is provided in the first power transmission path PT1 through which power of the engine 12 is transmitted to the output shaft 30, clutch C2 for CVT which is provided in the first power transmission path PT1 for connecting and disconnecting the first power transmission path PT1, linear solenoid valve SLS that controls the secondary pressure Ps supplied to the secondary pulley 70 by use of the command pressure Psls, and the secondary-side hydraulic pressure sensor 128 that determines the actual pressure Pssa supplied to the secondary pulley 70. In the electronic control unit 90 of the vehicular power transmission system 16, when a difference between the secondary pressure Ps set by use of the command pressure Psls of the linear solenoid valve SLS and the actual pressure Pssa obtained by the secondary-side hydraulic pressure sensor 128 is larger than the predetermined pressure difference Psa, during traveling using the first power transmission path PT1, the first power transmission path PT1 is disconnected, by use of the clutch C2 for CVT, and the primary pressure Pp supplied to the primary pulley 66 and the secondary pressure Ps supplied to the secondary pulley 70 are set to the respective command pressures Pslp, Psls so that the speed ratio γcvt of the CVT 24 becomes equal to the maximum value γmax. When the speed ratio γcvt of the CVT 24 is smaller than the predetermined first determination value γpa, it is determined that there is an abnormality that the output pressure of the linear solenoid valve SLS is lower than the command pressure Psls. When the speed ratio γcvt of the CVT 24 is larger than the predetermined second determination value γpb, it is determined that there is an abnormality in the secondary-side hydraulic pressure sensor 128. Thus, when there is a belt clamping force reduction abnormality, namely, when a difference between the command pressure Psls of the linear solenoid valve SLS and the actual pressure Pssa obtained by the secondary-side hydraulic pressure sensor 128 is larger than the predetermined pressure difference Psa, it is possible to identify which of the linear solenoid valve SLS and the secondary-side hydraulic pressure sensor 128 has a problem and causes the abnormality.

Also, according to this embodiment, the second power transmission path PT2 including the gear transmission mechanism 28 having at least one gear ratio between the engine 12 and the output shaft 30, and the clutch C1 for gears which connects and disconnects the second power transmission path PT2, are provided in parallel with the first power transmission path PT1 between the engine 12 and the output shaft 30. In this arrangement, too, when there is a belt clamping force reduction abnormality, namely, when a difference between the command pressure Psls of the linear solenoid valve SLS and the actual pressure Pssa obtained by the secondary-side hydraulic pressure sensor 128 is larger than the predetermined pressure difference Psa, it is possible to identify which of the linear solenoid valve SLS and the secondary-side hydraulic pressure sensor 128 has a problem that causes the abnormality.

Further, according to this embodiment, when the speed ratio γcvt of the CVT 24 is smaller than the predetermined first determination value γpa, it is determined that there is an abnormality that the output pressure of the linear solenoid valve SLS is lower than the command pressure Psls, and the vehicle is switched to the traveling mode using the second power transmission path PT2. When the speed ratio γcvt of the CVT 24 is larger than the predetermined second determination value γpb, it is determined that there is an abnormality in the secondary-side hydraulic pressure sensor 128, and traveling using the first power transmission path PT1 is resumed. Thus, when there is a belt clamping force reduction abnormality, it is possible to identify which of the linear solenoid valve SLS and the secondary-side hydraulic pressure sensor 128 has a problem that causes the abnormality, and appropriate limp-home traveling can be selected based on the result of identification.

Also, the primary pressure Pp supplied to the primary pulley 66 and the secondary pressure Ps supplied to the secondary pulley 70 are set to the respective command pressures Pslp, Psls so that the speed ratio γcvt of the CVT 24 becomes equal to the maximum value γmax, under a condition that the command pressure Pslp of the linear solenoid valve SLP is equal to or higher than the predetermined hydraulic pressure Pb. Thus, it is possible to avoid a situation where it is determined that the speed ratio γcvt of the CVT 24 is equal to the maximum value γmax, due to reduction of the primary pressure Pp supplied to the primary pulley 66, and it is erroneously determined that there is an abnormality in the secondary-side hydraulic pressure sensor 128, even though the secondary pressure Ps supplied to the secondary pulley 70 is reduced.

While the embodiment of the disclosure has been described in detail based on the drawings, the disclosure may be applied in other forms.

While the CVT 24 of the illustrated embodiment is operable to transmit power via the transmission belt 72, it does not necessarily use the transmission belt, but may use a chain, or the like, which can be looped around the pulleys, provided that the speed ratio γcvt is controlled with the clamping force applied to the pulleys.

The power transmission system 16 of the illustrated embodiment includes the first power transmission path PT1 through which power is transmitted via a WCVT, namely, a continuously variable transmission, and the second power transmission path PT2 through which drive power is transmitted via the gear transmission mechanism 28. However, the power transmission system may not include the second power transmission path PT2. Even in this case, when there is a belt clamping force reduction abnormality, it is possible to identify which of the linear solenoid valve SLS and the secondary-side hydraulic pressure sensor 128 has a problem that causes the abnormality.

The modifications as described above are merely exemplary, and the disclosure may be embodied with various modifications or improvements, based on the knowledge of those skilled in the art.

What is claimed is:

1. A controller of a power transmission system for a vehicle, the power transmission system including a continuously variable transmission, a continuously variable transmission connecting and disconnecting device, an electromagnetic control valve for a secondary pulley, and a hydraulic pressure sensor, the continuously variable transmission having a primary pulley, the secondary pulley, and a transmission element looped around the primary pulley and the secondary pulley, the continuously variable transmission being provided in a first power transmission path through which power of a drive power source is transmitted to an output shaft, the continuously variable transmission connecting and disconnecting device being provided in the first power transmission path and configured to connect and disconnect the first power transmission path, the electromagnetic control valve for the secondary pulley being configured to control a secondary pressure supplied to the secondary pulley, by use of a command pressure, the hydraulic pressure sensor being configured to determine an actual pressure supplied to the secondary pulley, the controller comprising an electronic control unit, wherein when a difference between the secondary pressure set by use of the command pressure of the electromagnetic control valve for the secondary pulley, and the actual pressure obtained by the hydraulic pressure sensor, is larger than a predetermined pressure difference, during traveling using the first power transmission path, the electronic control unit causes the continuously variable transmission connecting and disconnecting device to disconnect the first power transmission path, and sets a primary pressure supplied to the primary pulley and the secondary pressure supplied to the secondary pulley, by use of respective command pressures determined such that a speed ratio of the continuously variable transmission becomes substantially equal to a maximum value, and the electronic control unit determines that there is an abnormality that an output pressure of the electromagnetic control valve for the secondary pulley is low, when the speed ratio of the continuously variable transmission is smaller than a predetermined first determination value, and determines that there is an abnormality in the hydraulic pressure sensor, when the speed ratio of the continuously variable transmission is larger than a predetermined second determination value.

2. The controller according to claim 1, wherein
the power transmission system includes a second power transmission path, and a gear transmission mechanism connecting and disconnecting device,
the second power transmission path includes a speed change mechanism having at least one gear ratio between the drive power source and the output shaft, the gear transmission mechanism connecting and disconnecting device being configured to connect and disconnect the second power transmission path, and
the second power transmission path and the gear transmission mechanism connecting and disconnecting device are disposed in parallel with the first power transmission path between the drive power source and the output shaft.

3. The controller according to claim 2, wherein
the electronic control unit is configured to determine the abnormality that the output pressure of the electromagnetic control valve for the secondary pulley is low, and switch the vehicle to a traveling mode using the second power transmission path, when the speed ratio of the continuously variable transmission is smaller than the predetermined first determination value, and
the electronic control unit is configured to determine the abnormality in the hydraulic pressure sensor, and resume traveling using the first power transmission path, when the speed ratio of the continuously variable transmission is larger than the predetermined second determination value.

4. The controller according to claim 1, wherein
the power transmission system further includes an electromagnetic control valve for the primary pulley,
the electronic control unit is configured to set the primary pressure supplied to the primary pulley and the secondary pressure supplied to the secondary pulley, by use of a command pressure of the electromagnetic control valve for the primary pulley and the command pressure of the electromagnetic control valve for the secondary pulley which are determined such that the speed ratio of the continuously variable transmission becomes substantially equal to the maximum value, under a condition that the command pressure of the electromagnetic control valve for the primary pulley is equal to or higher than a predetermined hydraulic pressure.

* * * * *

UNITED STATES PATENT AND TRADEMARK OFFICE
CERTIFICATE OF CORRECTION

PATENT NO. : 10,738,883 B2
APPLICATION NO. : 16/352102
DATED : August 11, 2020
INVENTOR(S) : Kyohei Suzumura et al.

It is certified that error appears in the above-identified patent and that said Letters Patent is hereby corrected as shown below:

(73) Assignees should read:
TOYOTA JIDOSHA KABUSHIKI KAISHA, Toyota (JP);
DENSO TEN Limited, Kobe (JP)

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*